US008881205B2

(12) United States Patent
Friedman

(10) Patent No.: US 8,881,205 B2
(45) Date of Patent: Nov. 4, 2014

(54) SYSTEM FOR CONTROLLING MEDIA PRESENTATION DEVICES

(75) Inventor: Lee Friedman, Alpharetta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 1360 days.

(21) Appl. No.: 12/209,759

(22) Filed: Sep. 12, 2008

(65) Prior Publication Data
US 2010/0070997 A1 Mar. 18, 2010

(51) Int. Cl.
H04N 7/18 (2006.01)
(52) U.S. Cl.
USPC ............... 725/80; 725/25; 725/42; 725/44; 725/46; 725/78; 725/37; 715/835
(58) Field of Classification Search
USPC ............... 725/37, 25, 30, 78; 715/835
See application file for complete search history.

(56) References Cited

U.S. PATENT DOCUMENTS

| 6,437,836 | B1* | 8/2002 | Huang et al. ............... 348/734 |
| 6,747,591 | B1* | 6/2004 | Lilleness et al. ............. 341/176 |
| 7,831,930 | B2* | 11/2010 | Dresti et al. ................. 715/835 |
| 2002/0140855 | A1* | 10/2002 | Hayes et al. ................. 348/465 |
| 2003/0002638 | A1 | 1/2003 | Kaar |
| 2003/0117427 | A1* | 6/2003 | Haughawout et al. ........ 345/710 |
| 2005/0120381 | A1 | 6/2005 | Yamaguchi |
| 2005/0155052 | A1* | 7/2005 | Ostrowska et al. .......... 725/25 |
| 2006/0270452 | A1 | 11/2006 | Gerzberg |
| 2007/0028258 | A1* | 2/2007 | Wollmershauser et al. .... 725/29 |
| 2007/0124792 | A1 | 5/2007 | Bennett et al. |
| 2008/0148331 | A1 | 6/2008 | Walter et al. |
| 2009/0207184 | A1* | 8/2009 | Laine et al. .................. 345/619 |
| 2009/0239587 | A1* | 9/2009 | Negron et al. ................ 455/566 |

FOREIGN PATENT DOCUMENTS

| JP | 2005328394 | 11/2005 |
| NZ | 500203 | 2/2002 |
| WO | 0044168 | 7/2000 |
| WO | 0167316 | 9/2001 |

OTHER PUBLICATIONS

Sullivan et al., "Apparatus and Method for Communicating Media Between Communication Devices", 23 pages; U.S. Appl. No. 11/781,694, filed Jul. 23, 2007.
Scott White, "System for Presenting Media Programs", U.S. Appl. No. 11/738,367, filed Apr. 20, 2007, 23 pages.
TVCOMPASS Inc., "Wireless Interactive Entertainment", 1 page. http://www.tvcompass.com/remote_control/click_wireless.html; website last visited Sep. 12, 2008.

(Continued)

Primary Examiner — Jun Fei Zhong
(74) Attorney, Agent, or Firm — Guntin & Gust, PLC; Douglas Schnabel

(57) ABSTRACT

A system that incorporates teachings of the present disclosure may include, for example, a remote controller adapted to present a graphical user interface (GUI) with a first portion for selecting one or more set-top boxes (STBs) and one or more user accounts, and with a second portion corresponding to a console comprising a plurality of selectable icons, disable access to at least a portion of the plurality of selectable icons of the console, detect a selection of one of the STBs, detect a selection of one of the user accounts, establish a communication session with the selected STB, and enable access to the plurality of selectable icons of the console to manage operations of the selected STB. Other embodiments are disclosed.

27 Claims, 17 Drawing Sheets

(56) References Cited

OTHER PUBLICATIONS

Last100.com, "Archos Unveils DVR, WiFi-enabled Set-Top Box", 5 pages. http://www.last100.com/2008/01/04/archos-unveils-dvr-wifi-enabled-set-top-box/; website last visited Sep. 12, 2008.

Tvover.net, "Wireless HP IPTV Set-Top Box Unveiled", 6 pages. http://www.tvover.net/2007/03/20/Wireless+HD+IPTV+SetTop+Box+Unveiled.aspx; website last visited Sep. 12, 2008.

Google Adsense, "Earn Money From Relevant Ads on Your Website", 2 pages. https://www.google.com/adsense; website last visited Sep. 12, 2008.

Apple, Inc., "Iphone", 1 page; http://apple.com/iphone/; website last visited Sep. 12, 2008.

Click 365, "ESPN The Ultimate Remote", 1 page; http://www.espnremote.com/; website last visited Sep. 12, 2008.

* cited by examiner

600

900

SYSTEM FOR CONTROLLING MEDIA PRESENTATION DEVICES

FIELD OF THE DISCLOSURE

The present disclosure relates generally to media presentation techniques and more specifically to a system for managing media presentations.

BACKGROUND

A wireless remote controller for a set-top box (STB) can utilize radio frequency (RF) or infrared (IR) access technology to manage operations of the STB. IR remote controllers require line-of-sight connectivity to an STB. Some STBs that support an RF interface can be controlled instead by an RF remote controller with in some cases an operating range of up to 100 feet without the line-of-sight limitation of the IR remote controller.

Typically, when a remote controller is in use, the STB will update what is being presented on a TV screen, which in turn can change the viewing format of a program. For instance, if a user selects a guide button on the remote controller, some STBs will superimpose an electronic programming guide (EPG) on the program.

A manufacturer of remote controllers, such as tvCompass, Inc., has produced a remote controller that supports Wireless Fidelity (WiFi) technology for interconnecting over the Internet to an EPG system distributing programming information supplied by a company such as TV Guide™. TV Guide™ is a service provider of programming information that operates cooperatively but independently from a media service provider that supplies media services to STBs. A WiFi remote controller such as this can provide a user a means to browse through EPG data and other sources of information without altering TV programming while it is being presented by the STB.

DETAILED DESCRIPTION

Figure 1:
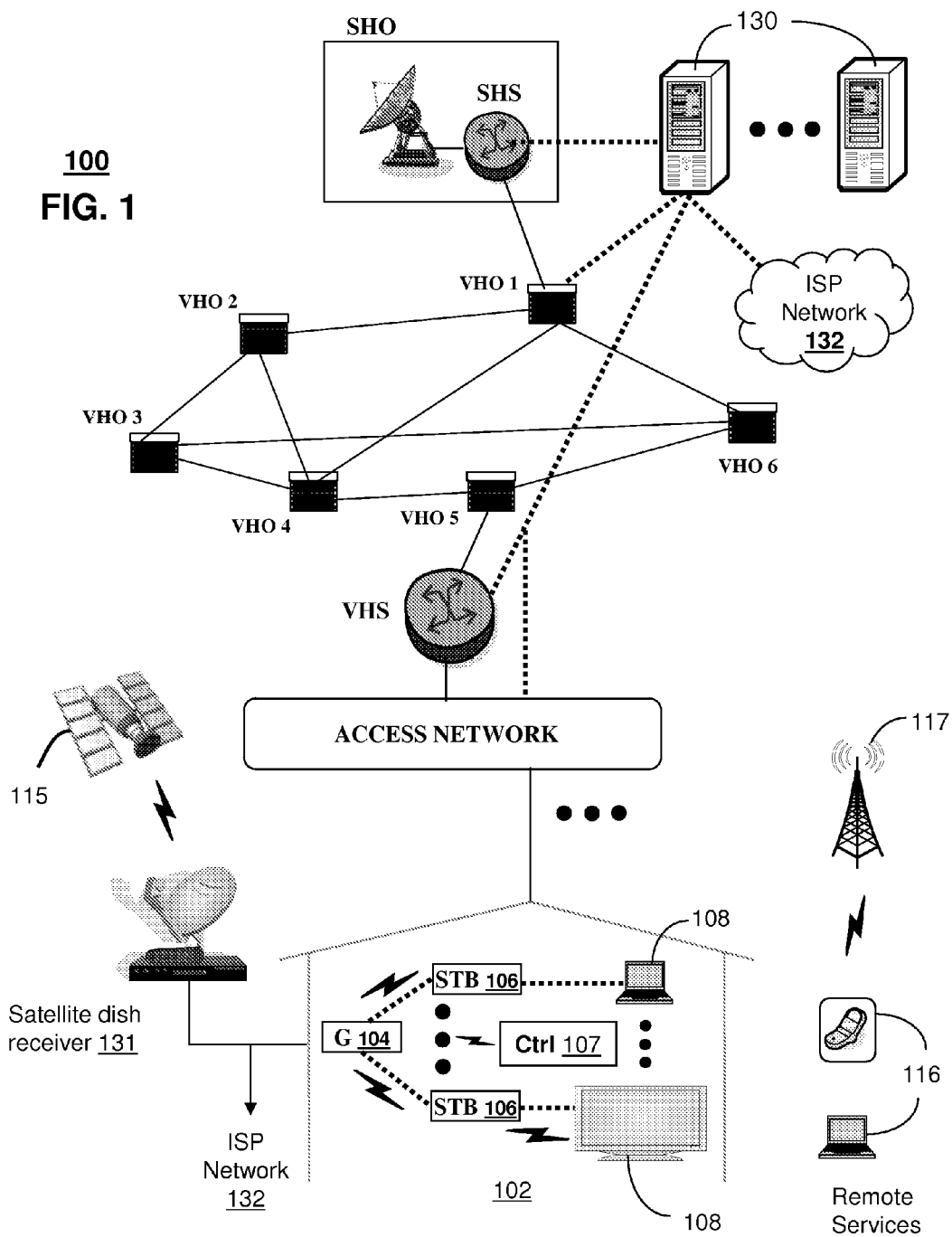
FIGS. 1-4 depict illustrative embodiments of communication systems that provide media services.

One embodiment of the present disclosure entails a remote controller having a transceiver, a user interface (UI), and a controller operably coupled to the transceiver and the UI. The controller can be adapted to cause the UI to present a graphical user interface (GUI) with a first portion for selecting one or more set-top boxes (STBs) and one or more user accounts, and with a second portion corresponding to a console comprising a plurality of selectable icons, each icon when selected causing the controller to present by way of the UI one of a plurality of other GUIs for controlling operations of one of the STBs, disable access to at least a portion of the plurality of selectable icons of the console while monitoring a selection of one of the STBs and one of the user accounts, detect from the UI a selection of one of the STBs, detect from the UI a selection of one of the user accounts, cause the transceiver to establish a communication session with the selected STB, and enable access to the plurality of selectable icons of the console to manage operations of the selected STB.

Another embodiment of the present disclosure entails a computer-readable storage medium having computer instructions for presenting a GUI with a first portion for selecting one or more STBs and one or more user accounts, and with a second portion corresponding to a console comprising a plurality of selectable icons, each icon when selected causing a presentation of one of a plurality of other GUIs for controlling operations of one of the STBs, disabling access to at least a portion of the plurality of selectable icons of the console, detecting a selection of one of the STBs, detecting a selection of one of the user accounts, establishing a communication session with the selected STB, and enabling access to the plurality of selectable icons of the console to manage operations of the selected STB.

Yet another embodiment of the present disclosure entails an STB having a controller to establish communications with a remote controller responsive to the remote controller presenting at a UI of the remote controller a GUI with a first portion for selecting one of the STB and one or more other STBs and one or more user accounts, and with a second portion corresponding to a console comprising a plurality of selectable icons, each icon when selected causing a presentation of one of a plurality of other GUIs for controlling operations of one of the STBs, disabling access to at least a portion of the plurality of selectable icons of the console, detecting from the UI a selection of the STB, detecting from the UI a selection of one of the user accounts, establishing a communication session with the STB, and enabling access to the plurality of selectable icons of the console to manage operations of the STB.

Another embodiment of the present disclosure entails a presenting a GUI for selecting one or more STBs, disabling a presentation of a console comprising a plurality of selectable icons, each icon when selected causing a presentation of one of a plurality of other GUIs for controlling operations of one of the STBs, detecting a selection of one of the STBs, establishing a communication session with the selected STB, and enabling the presentation of the console thereby providing access to the plurality of selectable icons of the console to manage operations of the selected STB.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via an access network to commercial and/or residential buildings 102 housing a gateway 104 (e.g., a residential gateway or RG). The access network can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media presentation devices 108 such as computers or television sets managed by a media controller 107 interconnected to the STB 106 over one or more network elements of the communication system 100. Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

Another distinct portion of the one or more computing devices 130 can be used as a remote controller (RC) subsystem 130 for processing and/or exchanging commands between subscriber STBs such as reference 106 and a remote controller such as reference 107, each operating from communication system 100. The remote controller 107 can utilize Internet-capable communications technology for interconnecting to the RC subsystem 130 by way of the ISP network 132, base station 117, or other network elements of the communication system 100. The remote controller 107 in this illustrative embodiment can represent a WiFi-capable remote controller that can connect to the RC subsystem 130 by way of gateway 104, or an Internet-capable mobile phone or laptop computer such as reference 116. A general description of these devices is provided in FIG. 6 which will be discussed below.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
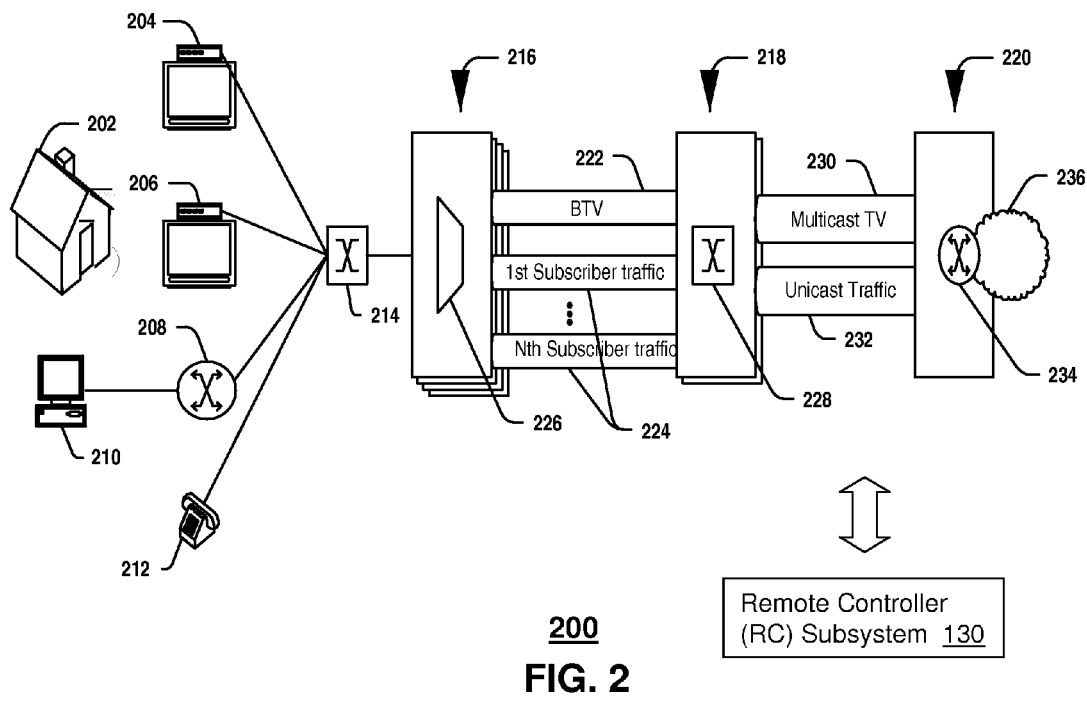

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The RC subsystem 130 of FIG. 1 can be operably coupled to the second communication system 200 for purposes similar to those described above.

Figure 3:
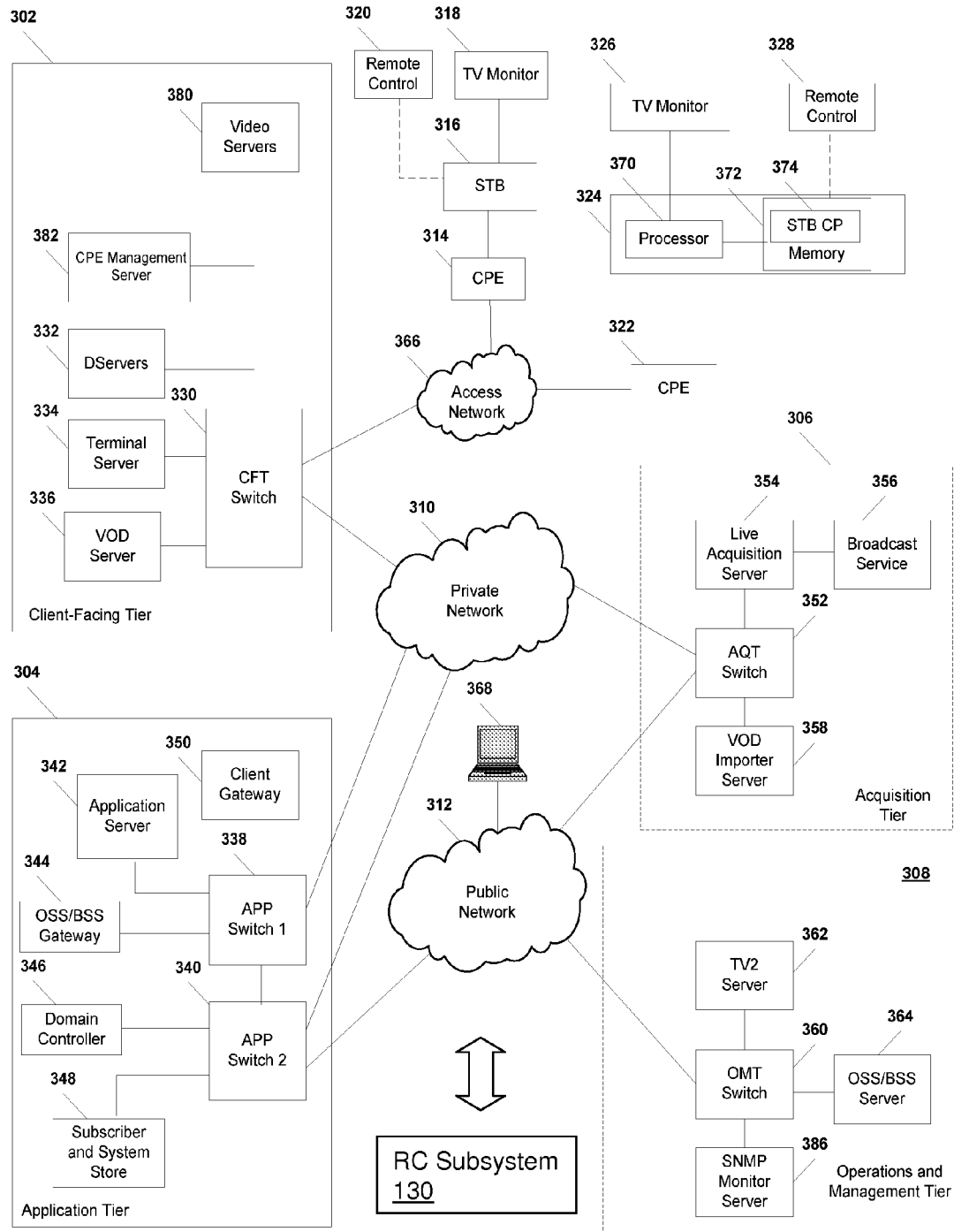

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The RC subsystem 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
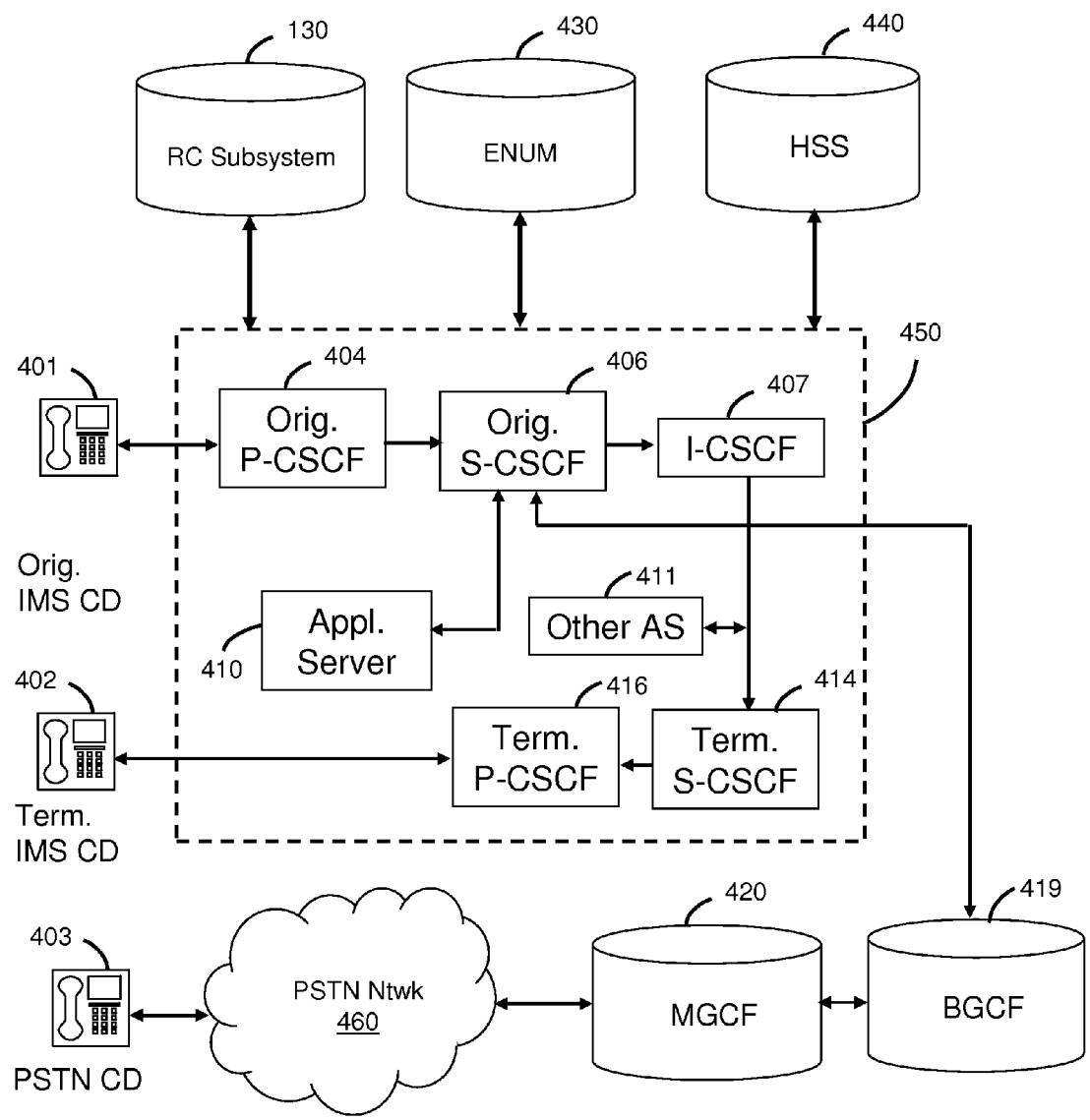

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the RC subsystem 130 previously discussed for FIG. 1. In this representative embodiment, the RC subsystem 130 can be accessed over a PSTN or VoIP channel of communication system 400 by common techniques such as described above.

Figure 5:
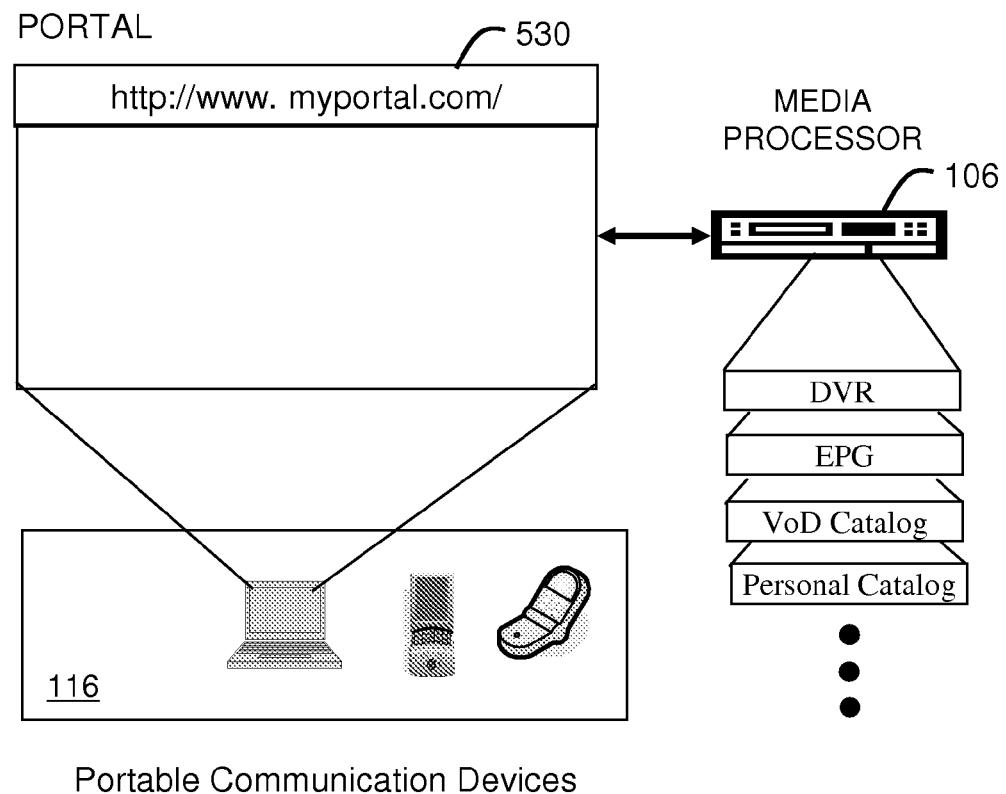
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
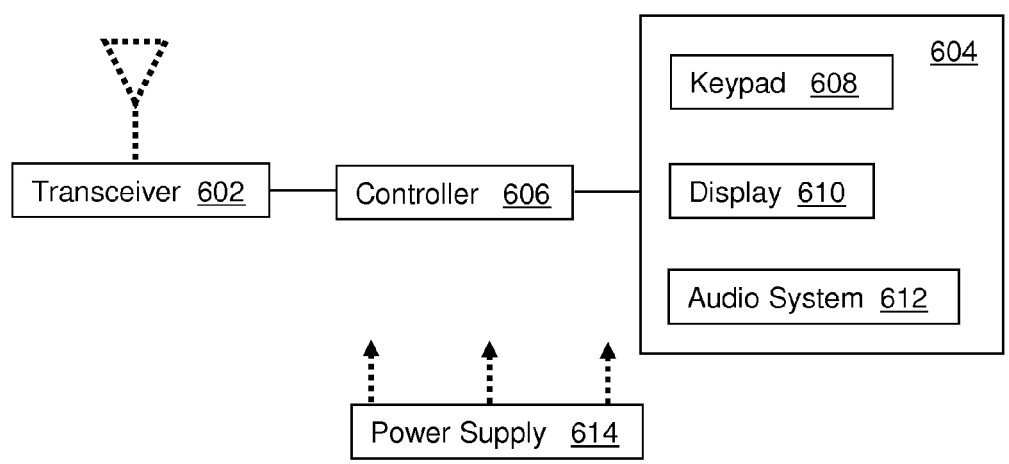
FIG. 6 depicts an illustrative embodiment of a communication device utilized in the communication systems of FIGS. 1-4.

FIG. 6 depicts an exemplary embodiment of a communication device 600. Communication device 600 can represent in whole or in part any of the aforementioned communication devices of FIGS. 1-4 including without limitation an STB, a remote controller, a cellular phone, a laptop computer, a cordless phone, and so on. The communication device 604 can comprise a wireline and/or wireless transceiver 602 (herein transceiver 602), a user interface (UI) 604, a power supply 614, and a controller 606 for managing operations thereof. The transceiver 602 can support short-range or long-range wireless access technologies such as a Bluetooth wireless access protocol, a Zigbee wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-LX, UMTS/HSDPA, GSM/GPRS, TDMA/EDGE, EVDO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support the IMS protocol for interfacing to an IMS network that can combine PSTN and VoIP communication technologies.

The UI 604 can include a depressible or touch-sensitive keypad 608 and a navigation mechanism such as a roller ball, joystick, mouse, and/or navigation disk for manipulating operations of the communication device 600. The keypad 608 can be an integral part of a housing assembly of the communication device 600 or an independent device operably coupled thereto by a tethered wiring interface (e.g., USB) or a wireless interface supporting for example Bluetooth. The keypad 608 can represent a numeric dialing keypad commonly used by phones, and/or a Qwerty keypad with alpha-numeric keys.

The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
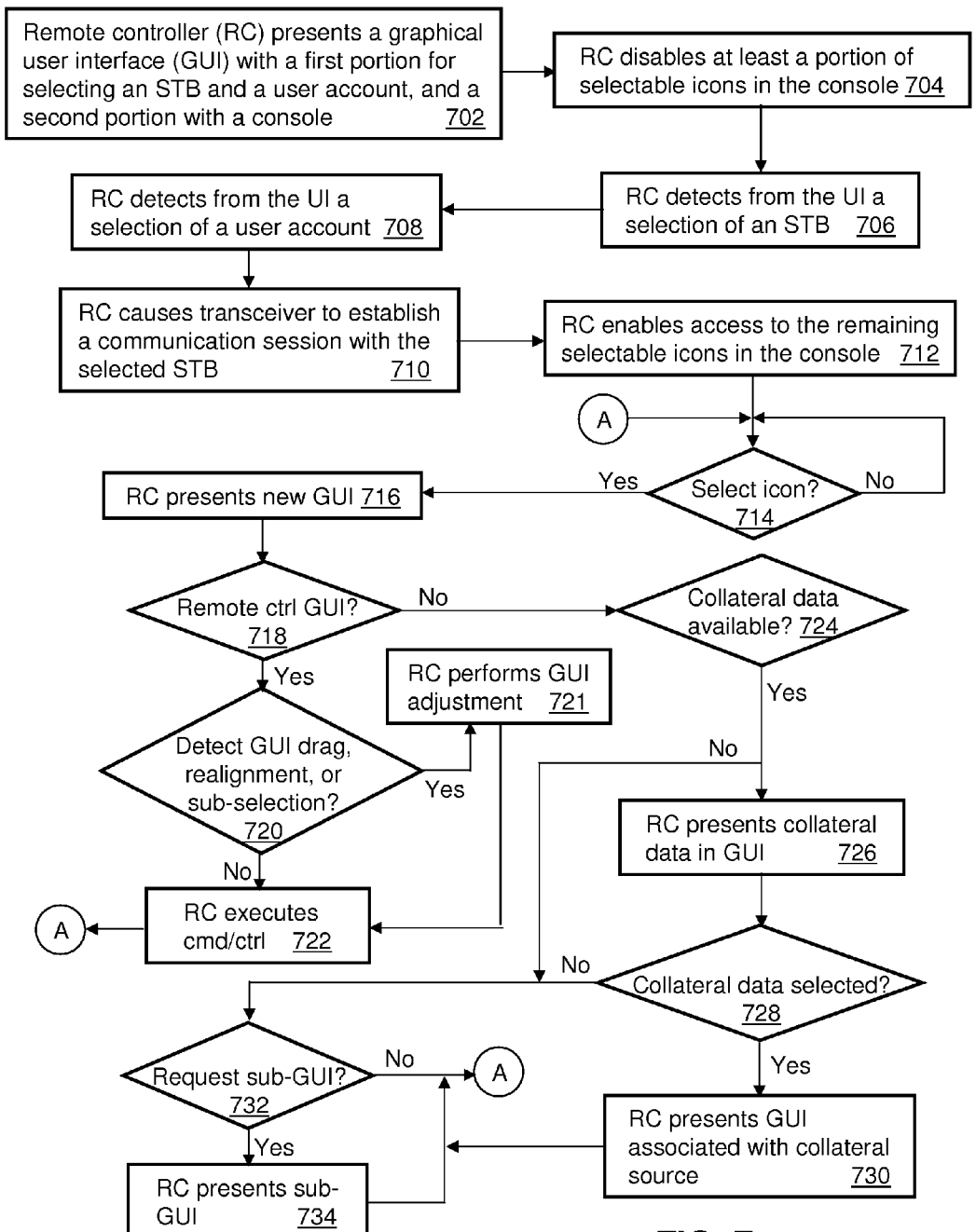
FIG. 7 depicts an illustrative embodiment of a method operating in portions of the communication systems of FIGS. 1-4.
Figure 8:
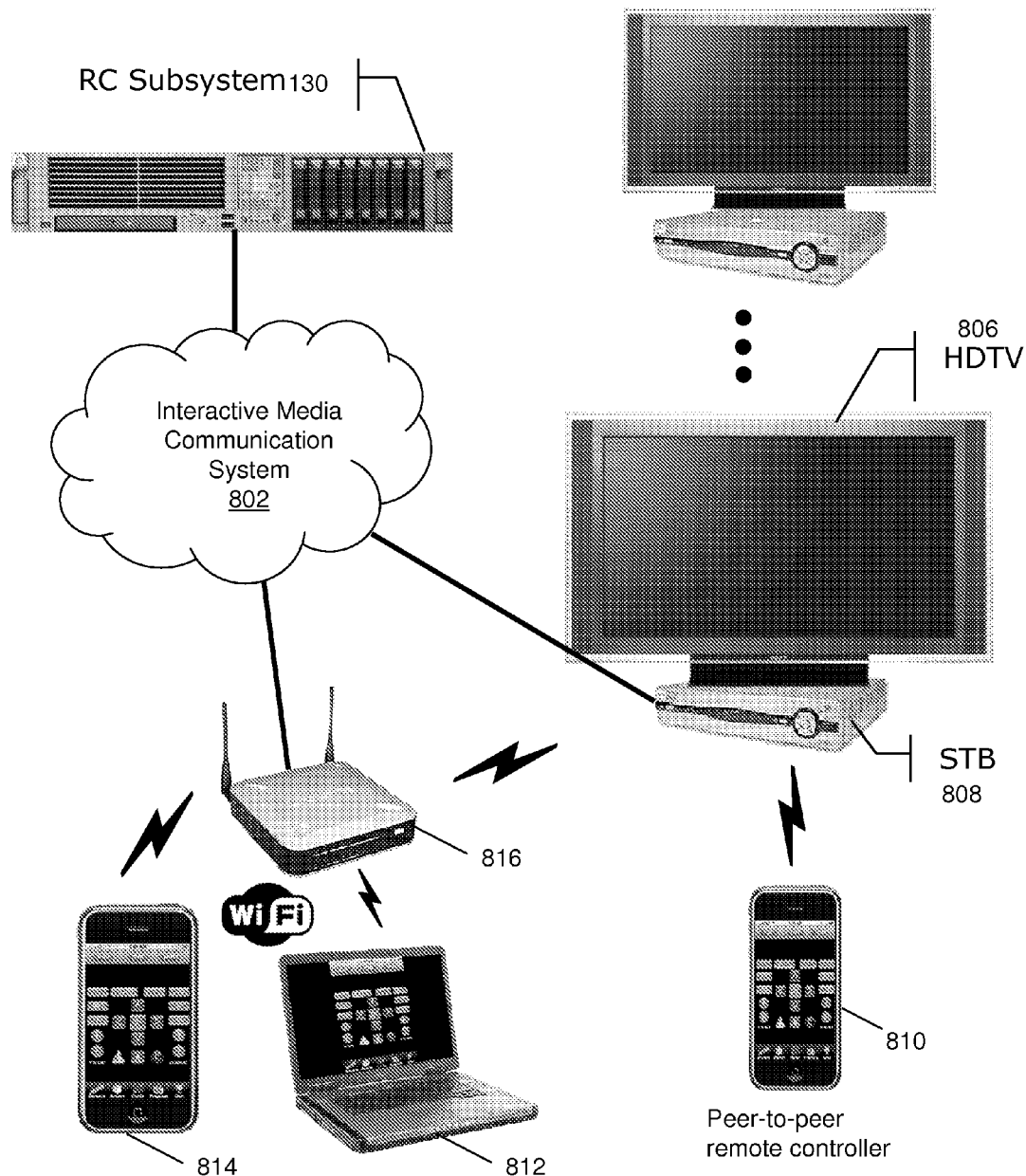
FIGS. 8-16 depict illustrative embodiments of the method of FIG. 7.

FIG. 7 depicts an illustrative method 700 operating in portions of communication systems 100-400. FIG. 8 depicts an illustrative block diagram for applying method 700. As shown in FIG. 8, a remote controller can represent a peer-to-peer RF (e.g., WiFi, Bluetooth or proprietary access technology) remote controller or an infrared remote controller 810 that can communicate with an STB 808 without intermediate device. In another illustrative embodiment, the remote controller can represent an Internet-capable mobile device such as a mobile phone 814 or laptop computer 812 each which can be communicatively coupled to a WiFi router/modem 816. The WiFi router/modem 816 can be a representative embodiment of gateway 104 of FIG. 1 which can provide access to services of an interactive media communication system 802 (such as the media communication systems of FIGS. 1-4) and its network elements such as the RC subsystem 130. In the case of the mobile phone 814, said device can also be operably coupled to the interactive media communication system 802 by way of a cellular base station such as reference 117 of FIG. 1 over a data channel such as GPRS, EVDO, UMTS, and so on.

Each of the representative embodiments of remote controllers 810, 812, 814 has a display to present a number of possible graphical users interface (GUIs) which will be described by method 700 and the illustrative embodiments of FIGS. 9-16. The display can be a touch-sensitive display which allows for manipulation and navigation of a GUI by touching the screen. Alternatively, the display can be accompanied by a keypad entry system and a navigation pad to perform manipulation and navigation functions.

The RC subsystem 130 can be coupled to the interactive media communication system 802 to provide devices 812, 814 the ability to manage operations of STB 808 while roaming a residence or commercial establishment, and in the case of the mobile phone 814 while also roaming a cellular network. The STB 808 can also be communicatively coupled to the interactive media communication system 802 by way of a common Internet-capable interface (e.g., Ethernet port of an xDSL or cable modem, etc.) and/or a direct coaxial or optical connection to said system. Accordingly, the STB 808 and the RC subsystem 130 can establish a communication session to provide remote control services to devices 812, 814.

The STB 808 can present media content on a media presentation device such as a common HDTV 806 over a coaxial cable or HDMI interface.

Figure 9:
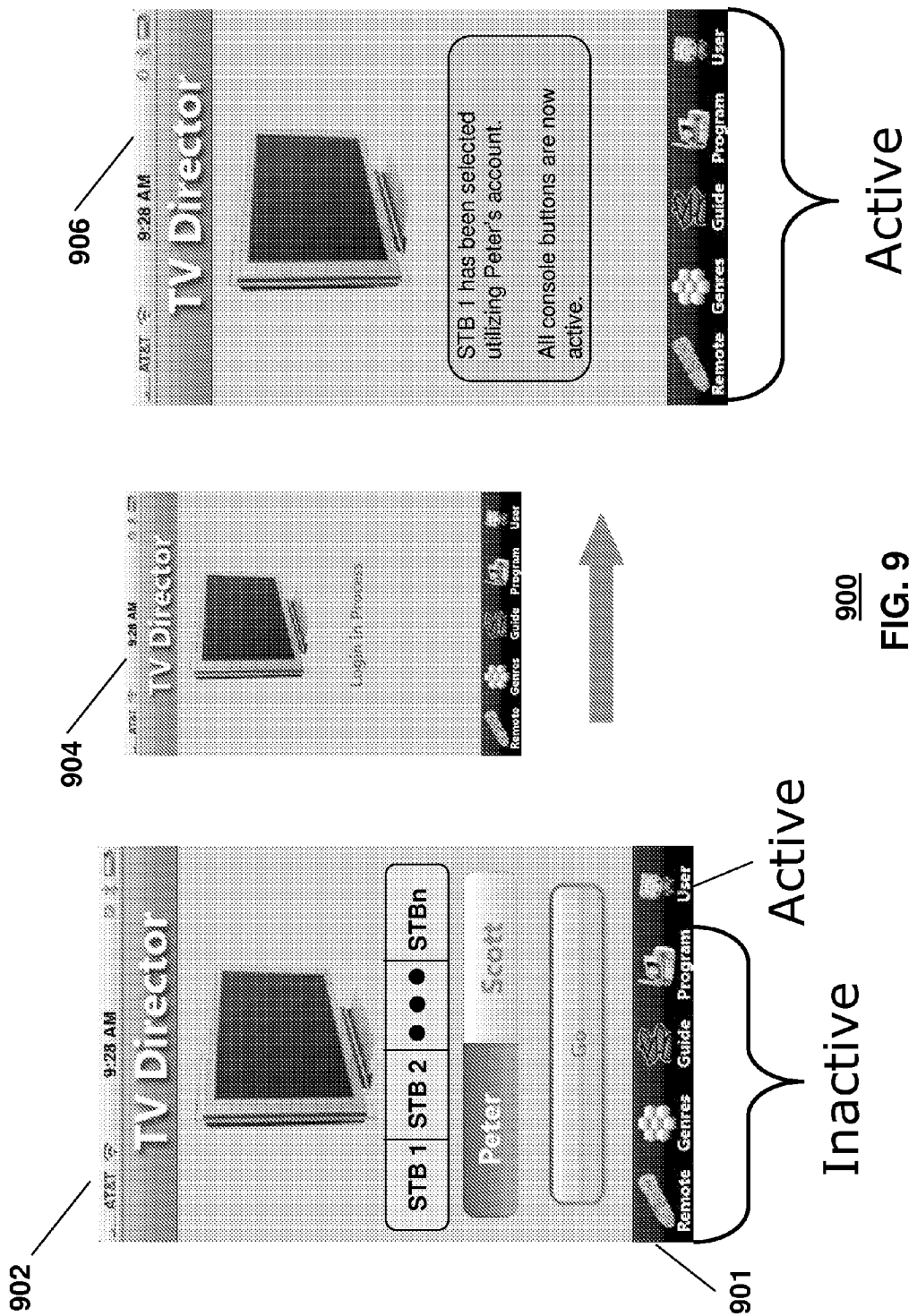

With the configurations of FIG. 8 in mind, method 700 can begin with step 702 in which a remote controller such as one of the above references 810, 812, 814 presents a GUI with a first portion for selecting an STB and a user account, and a second portion comprising a console with a plurality selectable icons, each of which can cause a presentation of one of a plurality of other GUIs for controlling operations of a selected STB. A representative embodiment of step 702 is shown in FIG. 9 in GUI 902 with a console 901. In step 704 the remote controller can be programmed to disable at least a portion of the selectable icons shown in the console 901. In this illustration, the "User" icon of the console 901 is active, while the Remote, Genres, Guide, and Program icons of the console are disabled. These icons are disabled while the remote controller awaits the selection of the STB and the user account, which in this illustration are shown as selectable GUI buttons in the first portion of the GUI 902.

Once selections of an STB and user account have been detected in steps 706, 708, the remote controller can cause in step 710 its transceiver to establish a communication session with the selected STB. GUI 904 illustratively represents a login process that can be presented responsive to step 710. Once the remote controller has established communications, it can present GUI 906 which presents the results of the login process. Although not shown, the remote controller can be programmed to also request authentication data to be entered by way of its user interface (keypad, touch-sensitive display, and/or audio system for detecting speech commands). The remote controller can validate the authentication data by way of stored information in the remote controller, stored information in the STB or the RC subsystem 130.

The transceiver used by the remote controller can be an RF or IR transceiver that communicates with the STB on a peer-to-peer basis (such as shown for reference 810) or by way of an intermediate network element such as the RC subsystem 130 and/or the WiFi modem/router 816 of FIG. 8. Any of the aforementioned RF access technologies can be used.

Figure 10:
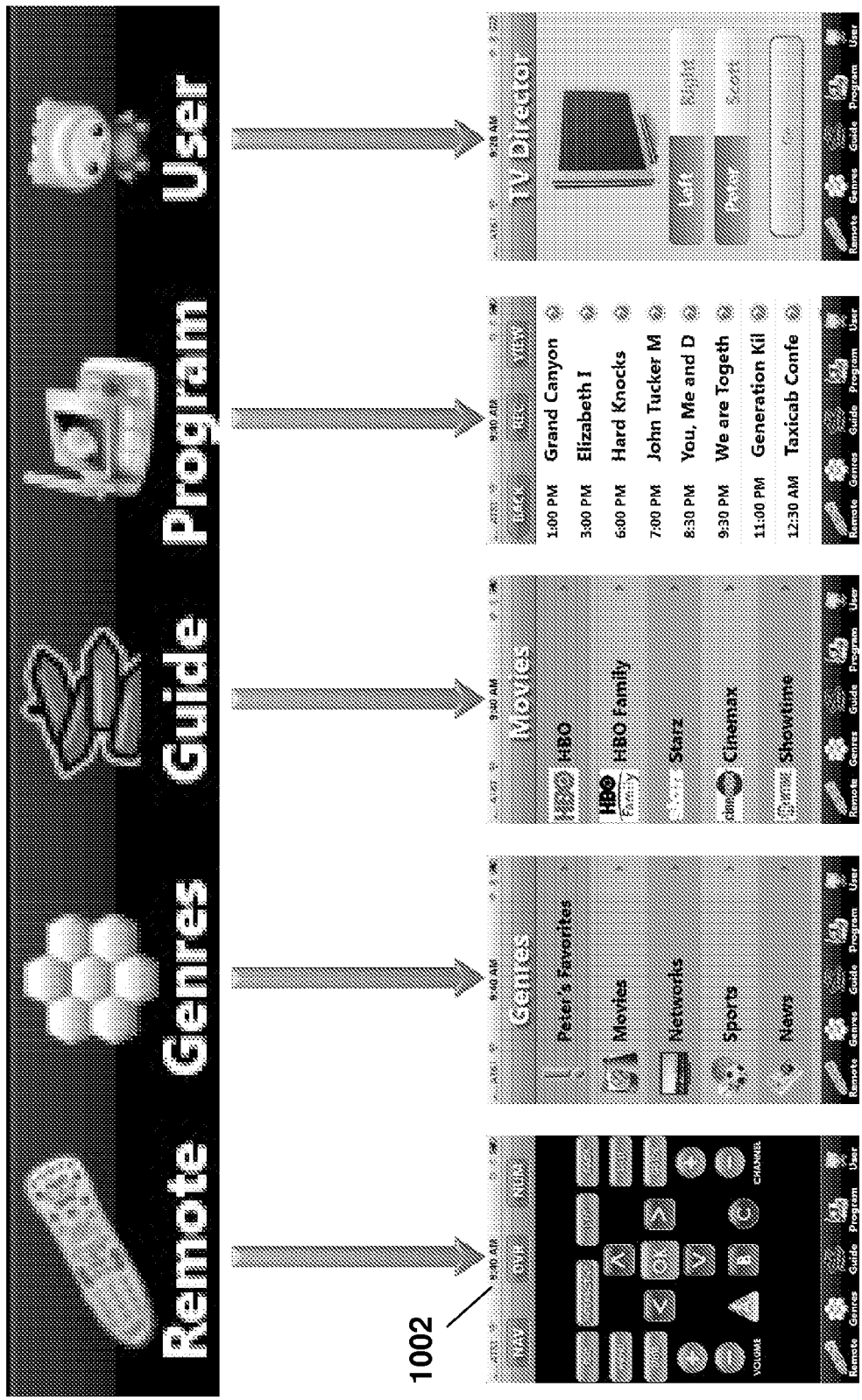

Once the remote controller is communicatively coupled to the selected STB, the remote controller can proceed to step 712 where it enables access to the remaining selectable icons of the console 901. Each of the selectable icons can produce a corresponding GUI for controlling operations of the STB as shown in FIG. 10. When the remote controller detects a selection in step 714, the remote controller presents the new GUI in step 716. If the remote controller detects in step 718 that the new GUI is a sectionalized remote control GUI such as reference 1002, the remote control proceeds to step 720 where it monitors while GUI 1002 is in use whether a drag, realignment, or sub-GUI element selection is invoked by a user of the remote controller.

Figure 11:
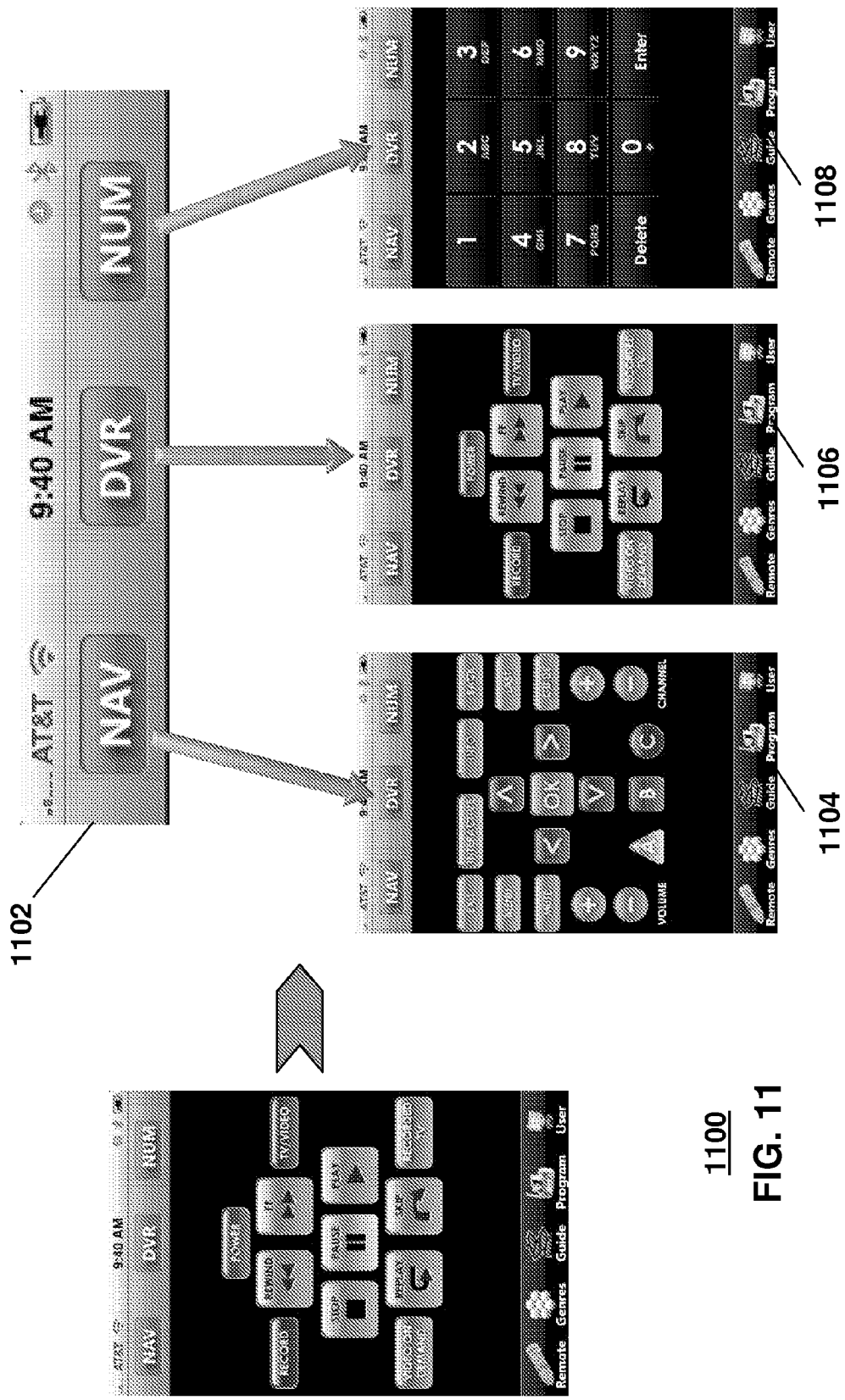
Figure 12:
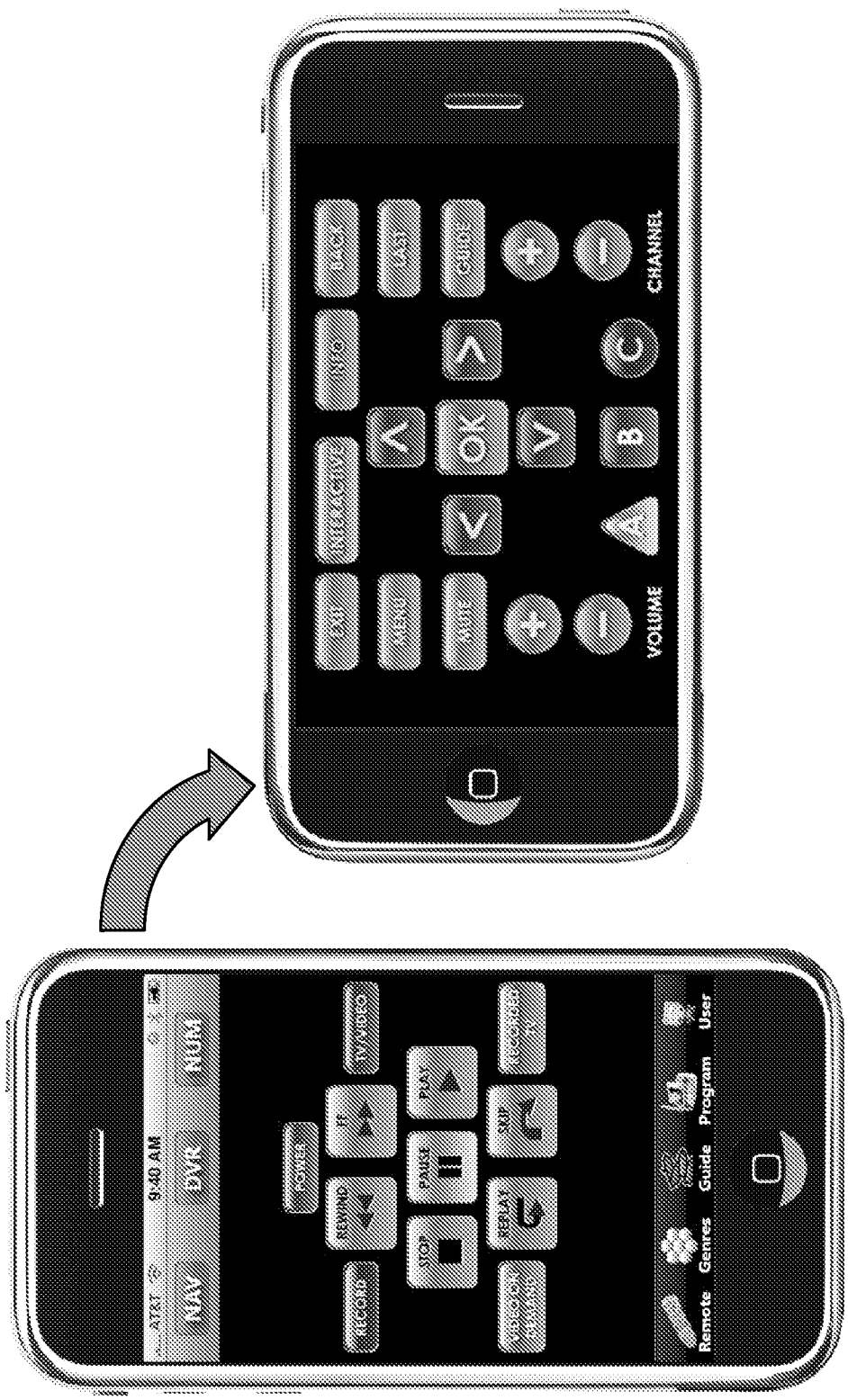

FIGS. 11-12 depict illustrative embodiments of step 720. As shown in FIG. 11, the sectionalized remote control GUI can comprise three sections: a first section for navigation (represented by GUI 1104), a second section for digital media recorder control (represented by GUI 1106), and a third section for selecting channel numbers (represented by GUI 1108). When there is a limitation in the size of the display of the remote controller, the remote controller can be programmed to show one of the three sections 1104, 1106, or 1108. In larger displays (e.g., laptop computer), the remote controller can be programmed to show more than one section or all sections as a contiguous GUI.

For smaller displays, the remote controller can switch between sections 1104, 1106, 1108 responsive to a selection one of three GUI elements in panel 1102, or by dragging one of the sections from its presentation position. For example, panel 1102 can show a NAVigation button, a DVR button, and a NUMber button. Selection of the NAV button can cause the remote controller to adjust the remote control GUI in step 721 so that the navigation GUI 1104 is presented. Selection of the DVR button or NUM button results in the presentation of the GUIs 1106 or 1108, respectively.

For remote controllers with a touch-sensitive display, a user of the remote controller can choose to drag a given section of the sectionalized remote control GUI from its center. The remote controller can be programmed to allow partial sections of the sectionalized remote control GUI to be displayed, or can apply a common snap grid map for each of the sections so that when a particular section is dragged laterally beyond a given threshold, the remote controller switches to another section of the sectionalized remote control GUI based on the direction of the lateral drag.

Once a user has chosen a section of the sectionalized remote control GUI of interest, the user can initiate command and control functions from said section in step 722, which in turn can affect operations of the selected STB. To assist the user, the remote controller can also detect by way of a common accelerometer integrated in the remote controller whether the user is attempting to view the section of the sectionalized remote control GUI in a portrait or landscape alignment. Once an alignment change is detected in step 720, the remote controller can adjust the GUI in step 721 as shown illustratively in FIG. 12.

During GUI presentations, the remote controller can continue to monitor in step 714 for a selection of an icon in the console 901. If, for example, subsequent to using the sectionalized remote control GUI another icon from the console 901 is selected, the remote controller can proceed to step 724 where it determines if collateral data is available for the new GUI presented at step 716. Collateral data can include for example metadata for describing media content, advertisement data, links to related media content, recommendations for other consumable media content, or an option to present a filmography of an individual. Other suitable forms of collateral data can be applied to the present disclosure. Collateral data can be supplied by the selected STB, the RC subsystem 130, other network elements of the media communication systems of FIGS. 1-4, as well as independent sources coupled to said systems. Independent sources can include without limitation, media content sources operated by other service providers (e.g., iTunes™), portals (Google™, Yahoo™), advertisement systems, brokerage systems, or other media content systems who's service operator may have a business relationship with the service provider of media communication systems of FIGS. 1-4.

If the remote controller detects in step 728 that its user has selected collateral data in the GUI of step 726, the remote controller can proceed to step 730 where it presents a new GUI associated with the selected collateral source. If the remote controller detects instead that collateral data is not available in step 724, the remote controller can proceed to step 732 to monitor a selection of a hierarchical sub-GUI. If a sub-GUI selection is detected, the remote controller can proceed to step 734 where it presents the requested sub-GUI. As in the case of step 722, the remote controller can continue to monitor in step 714 a selection of other icons from console 901.

Figure 13:
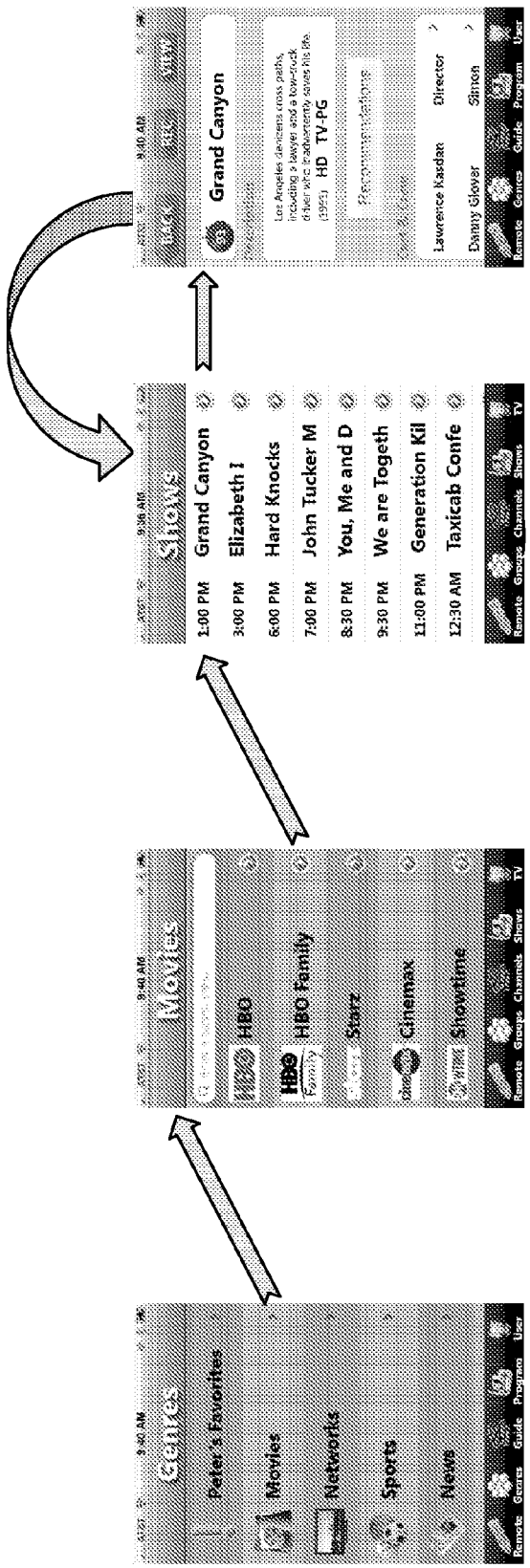

FIG. 13 presents an illustration of steps 724-734. In this illustration, the Genres icon is selected from the console 901. The GUI generated in step 716 for Genres icon shows a listing with Peter's Favorites, Movies, Networks, Sports, and News. Other listings may be available when scrolling down the Genre's GUI. The listings shown can be default listings defined by a service provider of the media communication system, or listings created according to user preferences retrieved from the user account selected in step 708, and/or behavioral data collected for the user associated with said account. The behavioral data can be generated by common tools that can detect behavioral patterns from observations of media content consumed by a user. From the detected patterns, these tools can also be used to identify media content preferences which can result in a listing as shown in the Genres GUI of FIG. 13.

As the Genres GUI shows, each listing can be hierarchical with one or more nested sub-GUIs. For instance, if a user selects the Movies listing, the remote controller invokes steps 732, 734 and thereby presents a Movies GUI with movie listings. The nested GUI hierarchy can continue as shown with the Shows GUI listing invoked by a selection of the HBO Family listing, and the Grand Canyon GUI invoked by the selection of the Grand Canyon listing. In these GUIs varying levels of collateral data (metadata descriptions, graphics, recommendations, and third party links) are shown. For instance the Shows GUI presents viewing times which can be supplied by an EPG database of the media communication systems of FIGS. 1-4, while the Grand Canyon GUI shows a program rating, a program description, recommendations, and listing of cast and crew for the selected program. Some of the collateral data used for the Grand Canyon GUI can be supplied directly by the media communication system, and/or by third party sources.

Figure 14:
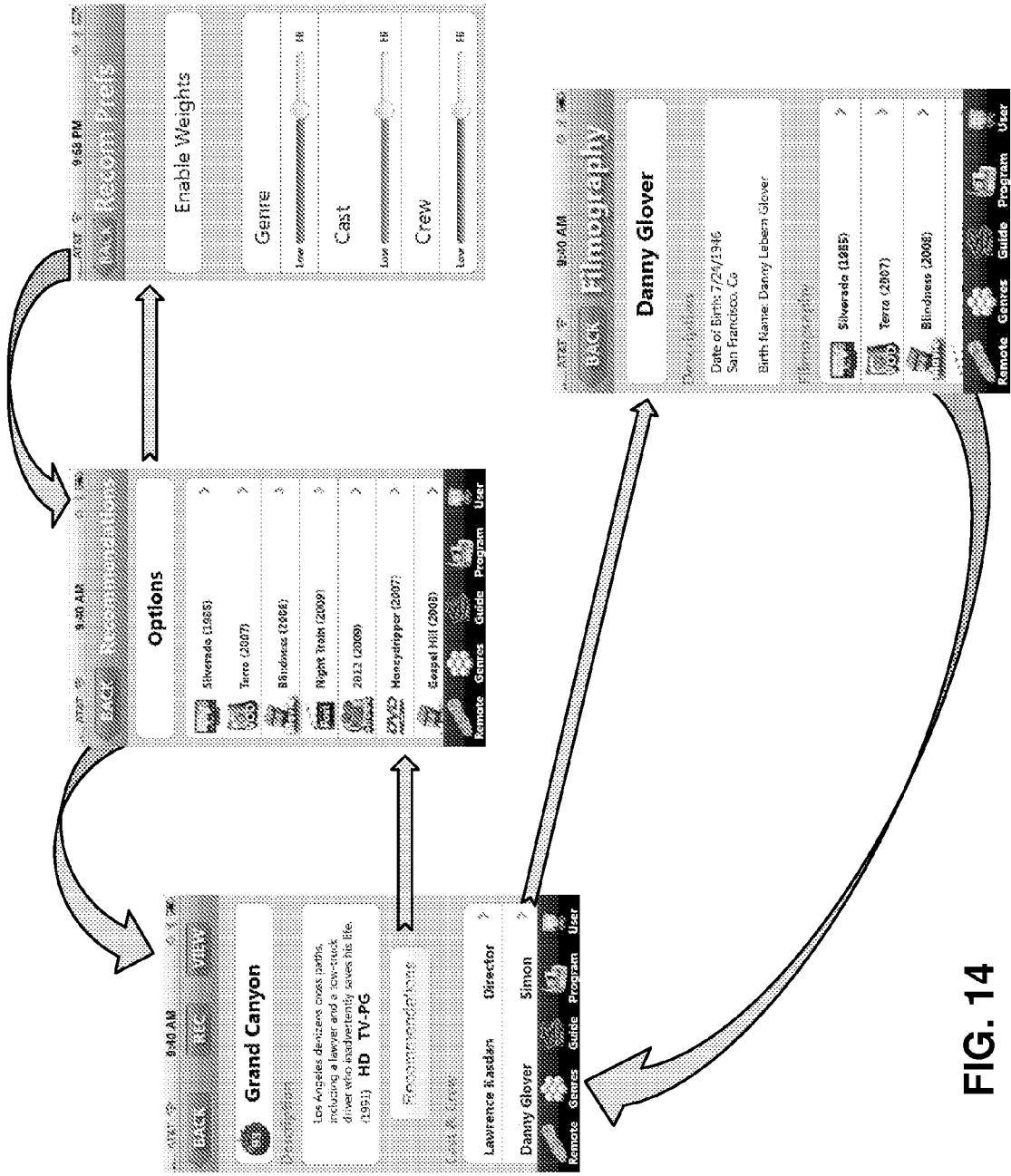

FIG. 14 illustrates further nesting of GUIs as well as a means to customize the presentation of collateral information. In this illustration, a selection of the Recommendation button of the Grand Canyon GUI can result in a GUI which presents a Recommendations GUI with media content that may have a genre relation to the Grand Canyon or some other association which can be determine by a network element of the media communication systems of FIGS. 1-4. To assist the network element supplying recommended media content, the remote controller can be programmed to present as part of step 726 a Recommendations Preferences GUI. This GUI can provide a user of the remote controller a means to apply weighting preferences for processing the metadata available to the network element of the media communication system performing the recommendation analysis.

In the Recommendation Preferences GUI, the user of the remote controller can adjust the level of importance of Genres versus Cast versus Crew by sliding a bar indicating a level of importance attributed by the user. As the weighting factors for these the metadata categories are adjusted, the collateral information presented in the GUI of step 726, which in this case is the Recommendations GUI of FIG. 14, can be adapted to match the preferences established by the user. Weighting metadata can be predefined in user preferences stored in the user's account, or can be dynamically adjusted on a content-by-content basis by the user.

Figure 15:
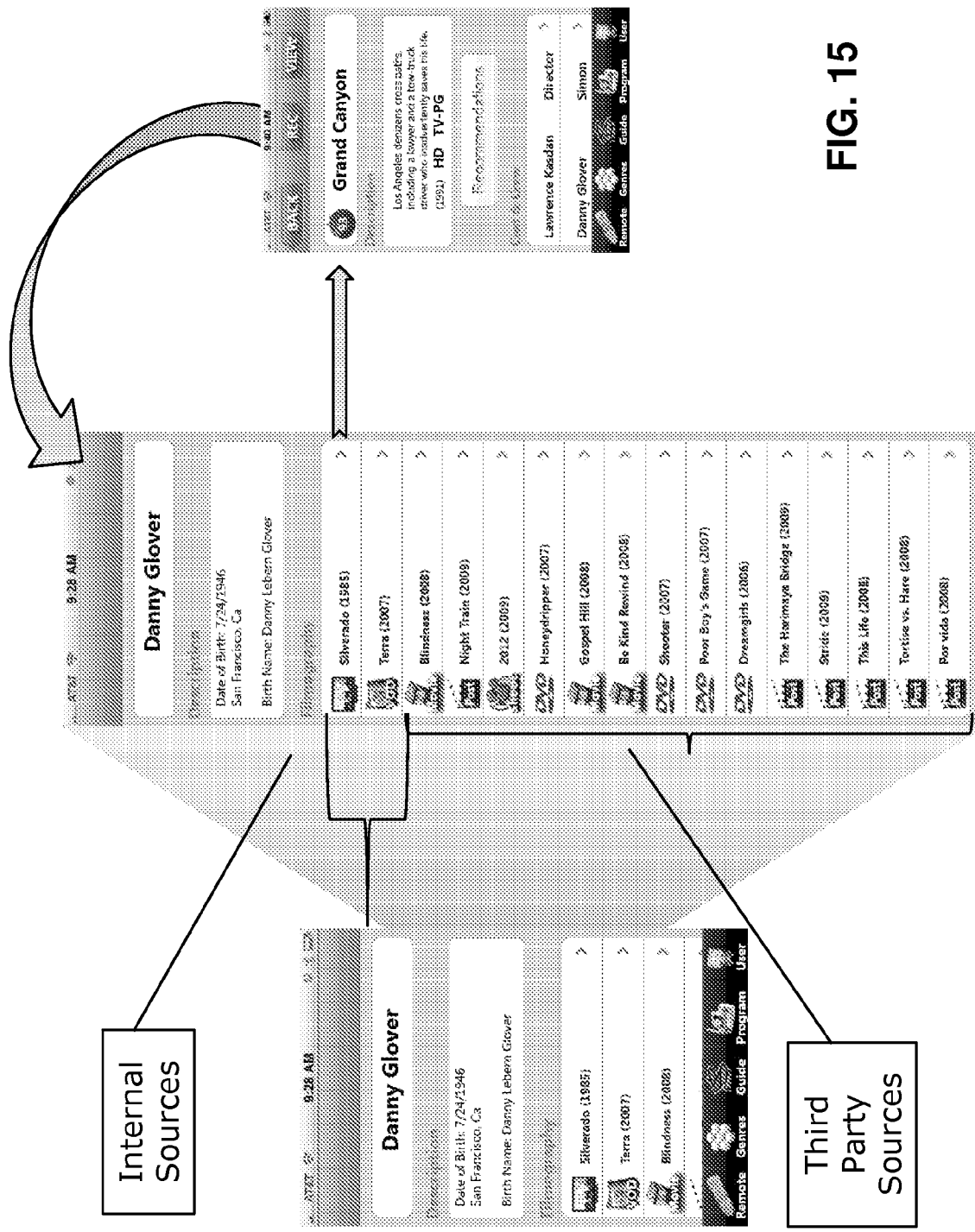

FIG. 14 further illustrates that the collateral data supplied in the Grand Canyon GUI can include internal collateral data (i.e., available to the media communication system) as well as external collateral data supplied by third party sources. In the present illustration, a filmography can be requested for one of the performers (Danny Glover). A detailed illustration of the filmography GUI for Danny Glover is shown in FIG. 15. This GUI illustrates that a portion of the media content in the filmography is provided by the media communication system directly, while other media content items are supplied by third party sources which may have a business relationship with the service provider providing media services to the selected STB.

Figure 16:
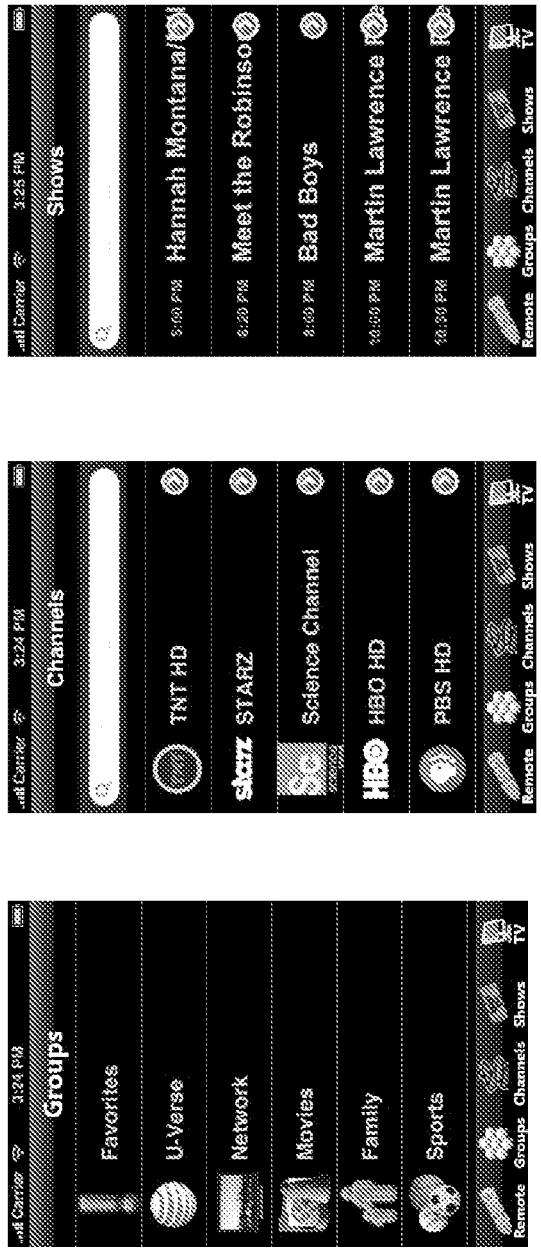

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that other selectable icons can be used in console 901. FIG. 16 provides an illustration of other potential icons such as for example: Groups, Channels, Shows, and TV icons. The Groups icon can be used to select a group of media content categories or sources defined by the user. The Channels icon can be used to present a list of favorite channels. The Shows icon can be used to show a list of favorite shows and their respective channels and viewing times. It would be evident to an artisan with ordinary skill in the art that any number of selectable icons can be used, customized by a user, or nested in the console or between GUIs.

In yet another embodiment, any of the GUIs and selectable icons in the console can be customized, repositioned in the console, or moved between GUIs. The customization of the GUIs and/or selectable icons can be performed manually by the user of the remote controller. For example, method 700 can be adapted so that the user of the remote controller can drag a selectable icon between GUI screens to reposition it, add a new selectable icon with features defined by the user, delete a selectable icon, or change the iconic look and feel of an existing selectable icon.

In another embodiment, the accelerometer of the remote controller can be used on any of the GUIs discussed above. Accordingly, some or all of the GUIs of FIGS. 13-16 can be displayed in a landscape arrangement which can also change how media content is presented in said GUI, and the extent of content shown. In another embodiment, method 700 can be adapted to insert advertisement data into one or more of the aforementioned GUIs based on behavioral data collected on the user associated with the selected user account, user preferences stored therein, or on the basis of analyzing media content as it is being presented to the user.

In yet another embodiment, method 700 can be adapted so that the console 901 of FIG. 9 is not presented in the GUI 902 while the user of the remote controller is selecting an STB, user accounts, and/or providing authentication information.

Once an STB, user account, and/or authentication data has been validated, the GUI 902 can be adapted to present the console 901 thereby providing the user a means to control the selected STB.

In addition, method 700 can be adapted so that the user of the remote controller can transition between STBs in different locations of a home. Once the user has been authenticated, method 700 can also be adapted to forego a request for authentication data when transitioning between STBs since it was provided on the first instance of controlling a select STB. Moreover, method 700 can be adapted so that the remote controller can detect the presence of another STB, and prompt the user by way of one of the GUIs discussed earlier, inquiring whether a switch to the detected STB is desirable.

It should be noted that the remote controller can correspond to any Internet-capable communication device as described by FIG. 6. Accordingly, the remote controller can represent for example a portable WiFi remote controller with a display, which can be used between rooms in a customer's premises without line of sight to the STB. The remote controller can also represent for example a WiFi-enabled laptop computer, a cellular phone with WiFi or an Internet-capable data channel, a WiFi cordless phone, and so on.

It is further noted that the present disclosure provides a means for a user of the remote controller to separate command and control from a viewing experience. Accordingly, long-range portable remote controllers such as a cellular phone can be used to control functions of an STB while the user is in transit (e.g., traveling on a train), on business travel in another state or country, located in another room of the user's residence, or located in some other location outside the residence. In this illustrative embodiment, the remote command and control functions (such as DVR control, parental controls, etc.) can be used to direct operations of a select STB at distances far from the reach of a selected STB by direct peer-to-peer access between the remote controller and the STB over an Internet connection, or by intermediate access to the STB using the subsystem 130.

In this embodiment, the remote controller can also be prompted by a request submitted by the subsystem 130 to enable a presentation of a media program that is blocked by parental control settings. The prompt can originate from a user of a select STB requesting access to the media program, which causes the STB to transmit this request to the subsystem 130 to be relayed to the parent carrying the remote controller outside the reach of the requesting party. In this instance, the remote user (parent) can accept or reject the request using the portable remote controller. Responses detected by the remote controller can then be transmitted thereby to the subsystem 130 which can then direct the initiating STB accordingly.

This bifurcation of command and control also provides a user of the remote controller a means to avoid a disruption or alteration of a media program being viewed at a media presentation device such as a TV controlled by the STB by one or more other users.

Other suitable modifications can be applied to the present disclosure without departing from the scope of the claims below. Accordingly, the reader is directed to the claims section for a fuller understanding of the breadth and scope of the present disclosure.

Figure 17:
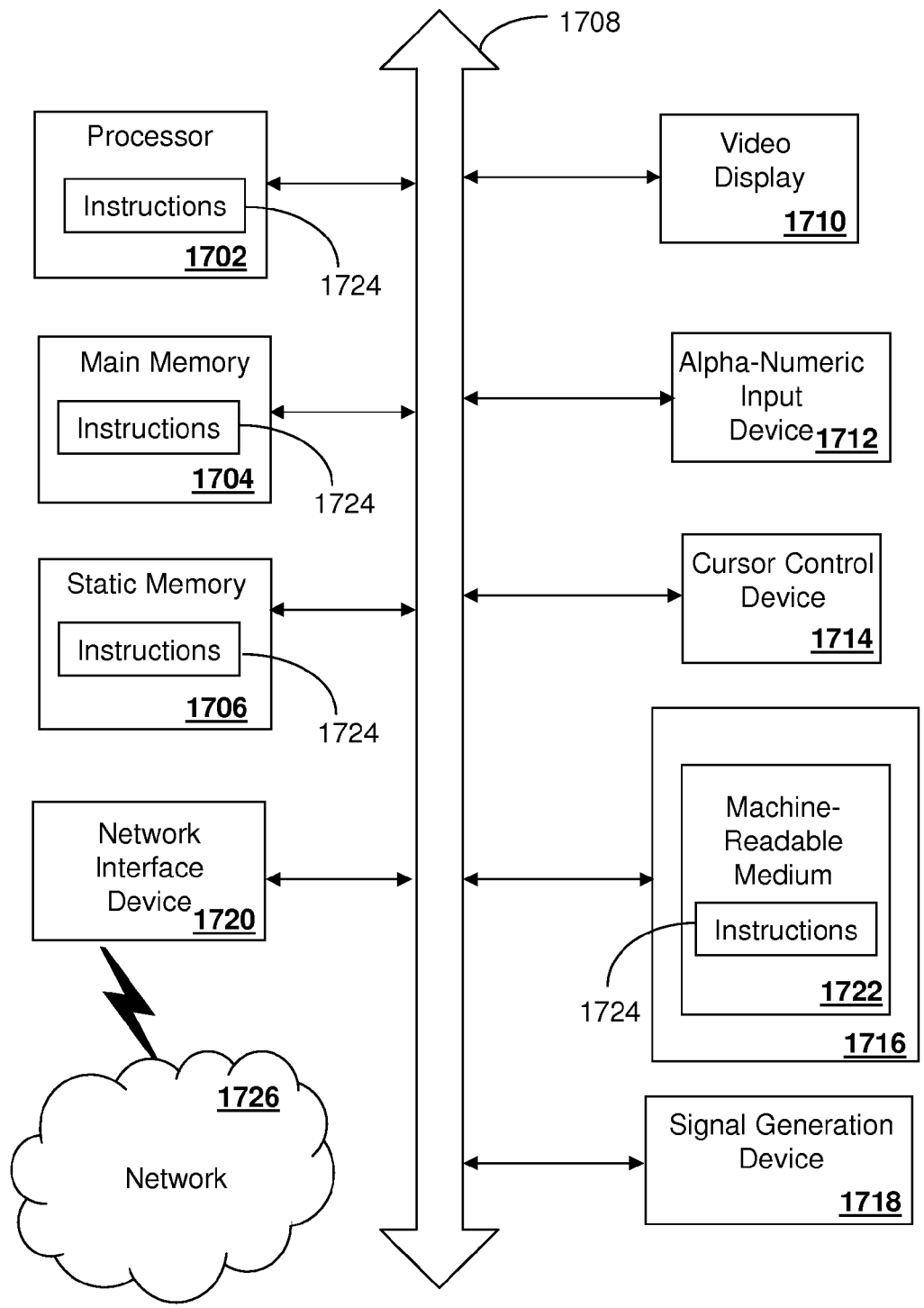
FIG. 17 is a diagrammatic representation of a machine in the form of a computer system within which a set of instructions, when executed, may cause the machine to perform any one or more of the methodologies discussed herein.

FIG. 17 depicts an exemplary diagrammatic representation of a machine in the form of a computer system 1700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1700 may include a processor 1702 (e.g., a central processing unit (CPU), a graphics processing unit (GPU, or both), a main memory 1704 and a static memory 1706, which communicate with each other via a bus 1708. The computer system 1700 may further include a video display unit 1710 (e.g., a liquid crystal display (LCD), a flat panel, a solid state display, or a cathode ray tube (CRT)). The computer system 1700 may include an input device 1712 (e.g., a keyboard), a cursor control device 1714 (e.g., a mouse), a disk drive unit 1716, a signal generation device 1718 (e.g., a speaker or remote control) and a network interface device 1720.

The disk drive unit 1716 may include a machine-readable medium 1722 on which is stored one or more sets of instructions (e.g., software 1724) embodying any one or more of the methodologies or functions described herein, including those methods illustrated above. The instructions 1724 may also reside, completely or at least partially, within the main memory 1704, the static memory 1706, and/or within the processor 1702 during execution thereof by the computer system 1700. The main memory 1704 and the processor 1702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1724, or that which receives and executes instructions 1724 from a propagated signal so that a device connected to a network environment 1726 can send or receive voice, video or data, and to communicate over the network 1726 using the instructions 1724. The instructions 1724 may further be transmitted or received over a network 1726 via the network interface device 1720.

While the machine-readable medium 1722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A remote controller, comprising:
a transceiver;
a user interface;
a memory to store executable instructions; and
a processor coupled to the transceiver, the memory, and the user interface, wherein the executable instructions facilitate performance of operations comprising:
causing the user interface to present a graphical user interface with a first portion for selecting a plurality of set-top boxes and a plurality of user accounts associated with an internet protocol television broadcast media system, and with a second portion comprising a plurality of selectable icons, each icon when selected causing the processor, responsive to executing the executable instructions, to perform operations comprising presenting, by way of the user interface, one graphical element of a plurality of graphical elements for controlling operations of the plurality of set-top boxes;
disabling access at the user interface to a first selectable icon of the plurality of selectable icons;
detecting from the user interface a first selection of a first set-top box of the plurality of set-top boxes to identify a selected set-top box;
detecting from the user interface a second selection of a first user account to identify a selected user account;
causing the transceiver to establish a communication session with the selected set-top box responsive to detecting the second selection;
accessing a first preference associated with the first user account;
presenting advertisement data in a first graphical element of the plurality of graphical elements according to the first preference;
accessing a second preference associated with the first user account;
presenting a recommendation for media content at a second graphical element of the plurality of graphical elements according to the second preference;
receiving authentication information via the graphical user interface;
validating the authentication information by way of first information stored at the selected set-top box;
enabling access to the first selectable icon to manage operations of the selected set-top box responsive to validating the authentication information;
presenting a third graphical element according to a third selection of the first selectable icon;
determining if collateral data is available according to a user interaction with the third graphical element;
accessing the collateral data from a source outside of the internet protocol television broadcast media system; and
presenting the collateral data.

2. The remote controller of claim 1, wherein the user interface comprises one of a display, an audio system, or a keypad entry system, and wherein the remote controller corresponds to an Internet-capable communication device.

3. The remote controller of claim 2, wherein the display is a touch-sensitive display device, wherein the keypad entry system is presented in whole or in part by way of the touch-sensitive display device, and wherein the Internet-capable communication device corresponds to one of a portable computer, a cellular phone, or a cordless phone.

4. The remote controller of claim 1, wherein the processor, responsive to executing the executable instructions, performs operations comprising:
requesting by way of the user interface the authentication information associated with the selected user account; and
detecting from the user interface an entry of the authentication information.

5. The remote controller of claim 1, wherein validating the authentication information further comprises comparing the authentication information with second information associated with the selected user account that is stored in the remote controller.

6. The remote controller of claim 1, wherein the plurality of selectable icons comprise one of a user account icon, a remote control icon, a genre icon, an electronic programming guide icon, a video content icon, an audio content icon, a grouping icon, a channels icon, a shows icon, a TV icon, or a combination thereof.

7. The remote controller of claim 1, wherein the plurality of selectable icons are hierarchical and not visible in the graphical user interface with the first portion and the second portion.

8. The remote controller of claim 1, wherein the processor, responsive to executing the executable instructions, performs operations comprising:
detecting a fourth selection of a remote control icon; and
causing the user interface to present a sectionalized remote control graphical user interface responsive to detecting the fourth selection.

9. The remote controller of claim 8, wherein the sectionalized remote control graphical user interface comprises a first section for navigation, a second section for digital media recorder control, and a third section for selecting channel numbers.

10. The remote controller of claim 9, wherein the sectionalized remote control graphical user interface comprises three selectable graphical user interface elements, each graphical user interface element when selected causing the controller to perform operations comprising presenting the remote control graphical user interface.

11. The remote controller of claim 9, wherein the processor, responsive to executing the executable instructions, performs operations comprising:
detecting from the user interface a request to laterally drag the remote control graphical user interface; and
causing the user interface to expose a third portion of the remote control graphical user interface.

12. The remote controller of claim 9, wherein the processor, responsive to executing the executable instructions, performs operations comprising:
detecting from the user interface a request to laterally drag the remote control graphical user interface;

detecting from the request that the remote control graphical user interface has been dragged beyond a threshold of a grid; and causing the user interface to expose in its entirety the remote control graphical user interface responsive to detecting that the remote control graphical user interface has been dragged beyond the threshold of the grid.

13. The remote controller of claim 1, wherein the processor, responsive to executing the executable instructions, performs operations comprising:

detecting a signal from an accelerometer of the remote controller indicating a change in a physical orientation of the user interface; and causing the user interface to change an orientation of presentation of the graphical user interface with the first portion and the second portion, the plurality of selectable icons, or the graphical user interface responsive to detecting the signal from the accelerometer.

14. The remote controller of claim 1, wherein the processor, responsive to executing the executable instructions, performs operations comprising presenting at the user interface a modification of the graphical user interface with the first portion and the second portion, wherein the modification is initiated by the remote controller, and wherein the modification is based on user preferences or behavioral data associated with the selected user account.

15. The remote controller of claim 1, wherein the processor, responsive to executing the executable instructions, performs operations comprising presenting a modification of a third portion of the graphical user interface initiated by a selection of one of the plurality of selectable icons, wherein the modification is initiated by the remote controller, and wherein the modification is based on a weighting factor applied to metadata.

16. The remote controller of claim 15, wherein the weighting factor is supplied by the selected user account from input information supplied by way of the user interface.

17. The remote controller of claim 1, wherein the processor, responsive to executing the executable instructions, performs operations comprising presenting one of advertisement data, links to related media content, recommendations for consumable media content, or an option to present filmography of an individual by way of the graphical user interface initiated by a selection of one of the plurality of selectable icons.

18. The remote controller of claim 1, wherein the remote controller and the selected set-top box operate from a media communication system, and wherein the media communication system comprises one of an Internet Protocol multimedia subsystem communication system, an Internet Protocol television communication system, a cable television communication system, a satellite television communication system, or combinations thereof.

19. The remote controller of claim 1, wherein the processor, responsive to executing the executable instructions, performs operations comprising managing operations of the selected set-top box by way of one of a subsystem of a media communication system, or a peer-to-peer communication session established between the remote controller and the selected set-top box.

20. A computer-readable storage device, comprising executable instructions which, responsive to being executed by a processor, facilitate performance of operations comprising:

presenting a graphical user interface with a first portion for selecting a plurality of set-top boxes and a plurality of user accounts associated with an internet protocol television broadcast media system, and with a second portion comprising a console comprising a plurality of selectable icons, each icon when selected causing a presentation of one of a plurality of graphical user elements for controlling operations of the plurality of set-top boxes;

disabling access to a first selectable icon of the plurality of selectable icons of the console;

detecting a first selection of a first set-top box to identify a selected set-top box of the plurality of set-top boxes;

detecting a second selection of a first user account to identify a selected user account;

establishing a communication session with the selected set-top box responsive to detecting the first selection;

accessing a first preference associated with the first user account;

presenting advertisement data in a first graphical element of the plurality of graphical elements according to the first preference;

accessing a second preference associated with the first user account;

presenting a recommendation for media content at a second graphical element of the plurality of graphical elements according to the second preference;

receiving authentication information via the graphical user interface;

validating the authentication information by way of first information stored at the selected set-top box;

enabling access to the first selectable icon of the console to manage operations of the selected set-top box responsive to validating the authentication information;

presenting a third graphical user element according to a third selection of the first selectable icon;

determining if collateral data is available according to a user interaction with the third graphical user element;

accessing the collateral data from a source outside of the internet protocol television broadcast media system; and presenting the collateral data.

21. The storage device of claim 20, comprising executable instructions which, responsive to being executed by the processor, cause the processor to perform operations comprising presenting a modification of the graphical user interface initiated by a selection of one of the plurality of selectable icons, wherein the modification is based on user preferences or behavioral data associated with the selected user account.

22. The storage device of claim 20, comprising executable instructions which, responsive to being executed by the processor, cause the processor to perform operations comprising presenting a modification of the graphical user interface initiated by a selection of one of the plurality of selectable icons, wherein the modification is based on weighting factors applied to metadata supplied in the graphical user interface.

23. A set-top box, comprising:

a memory to store executable instructions; and a processor communicatively coupled to the memory, wherein the processor, responsive to executing the executable instructions, facilitates performance of operations comprising establishing communications with a remote controller responsive to the remote controller:

presenting at a user interface of the remote controller a graphical user interface with a first portion for selecting a plurality of set-top boxes associated with an internet protocol television broadcast media system and with a second portion comprising a plurality of selectable icons, each icon when selected causing a presentation of one of a plurality of graphical user elements for controlling operations of the plurality of set-top boxes;
disabling access to a first selectable icon of the plurality of selectable icons;
detecting from the user interface a first selection of a first set-top box to identify a selected set-top box of the plurality of set-top boxes;
detecting from the user interface a second selection of a first user account to identify a selected user account;
establishing a communication session with the selected set-top box responsive to detecting the first selection;
accessing a first preference associated with the first user account;
presenting advertisement data in a first graphical element of the plurality of graphical elements according to the first preference;
accessing a second preference associated with the first user account;
presenting a recommendation for media content at a second graphical element of the plurality of graphical elements according to the second preference;
receiving authentication information via the graphical user interface;
validating the authentication information by way of first information stored at the selected set-top box;
enabling access to the first selectable icon to manage operations of the selected set-top box responsive to validating the authentication information;
presenting a third graphical user element according to a third selection of the first selectable icon;
determining if collateral data is available according to a user interaction with the third graphical user element;
accessing the collateral data from a source outside of the internet protocol television broadcast media system; and
presenting the collateral data.

24. The set-top box of claim 23, wherein the remote controller and the first set-top box operate from a media communication system, and wherein the media communication system comprises one of an Internet Protocol multimedia subsystem communication system, an Internet Protocol television communication system, a cable television communication system, a satellite television communication system, or combinations thereof.

25. A method, comprising:
presenting, by a system comprising a processor, a graphical user interface for selecting a plurality of set-top boxes;
disabling, by the system, a first selectable icon of a console comprising a plurality of selectable icons, each icon when selected causing a first presentation of one of a plurality of graphical user elements for controlling operations of one of the plurality of set-top boxes of an internet protocol television broadcast media system;
detecting, by the system, a first selection of a first set-top box of the plurality of set-top boxes to identify a selected set-top box;
establishing, by the system, a communication session with the selected set-top box responsive to detecting the first selection;
accessing, by the system, a first preference associated with a first user account;
presenting, by the system, advertisement data in a first graphical element of the plurality of graphical elements according to the first preference;
accessing, by the system, a second preference associated with the first user account;
presenting, by the system, a recommendation for media content at a second graphical element of the plurality of graphical elements according to the second preference;
receiving, by the system, authentication information via the graphical user interface;
validating, by the system, the authentication information by way of first information stored at the selected set-top box;
enabling, by the system, the first selectable icon of the console to manage operations of the selected set-top box responsive to validating the authentication information;
presenting, by the system, a third graphical user element according to a second selection of the first selectable icon;
determining, by the system, if collateral data is available according to a user interaction with the third graphical user element;
accessing, by the system, the collateral data from a source outside of the internet protocol television broadcast media system; and
presenting, by the system, the collateral data.

26. The method of claim 25, comprising:
detecting, by the system, a third selection of a user account to identify a selected user account; and
requesting, by the system, the authentication information, wherein the authentication information is associated with the selected user account.

27. The method of claim 26, comprising:
detecting, by the system, a request to switch between the selected set-top box and a second set-top box; and
enabling, by the system, control of the second set-top box without requesting the authentication information.

* * * * *